Nov. 2, 1954  W. O. BEYER  2,693,378
QUICK-RELEASE COUPLING
Filed Dec. 11, 1950  2 Sheets-Sheet 2
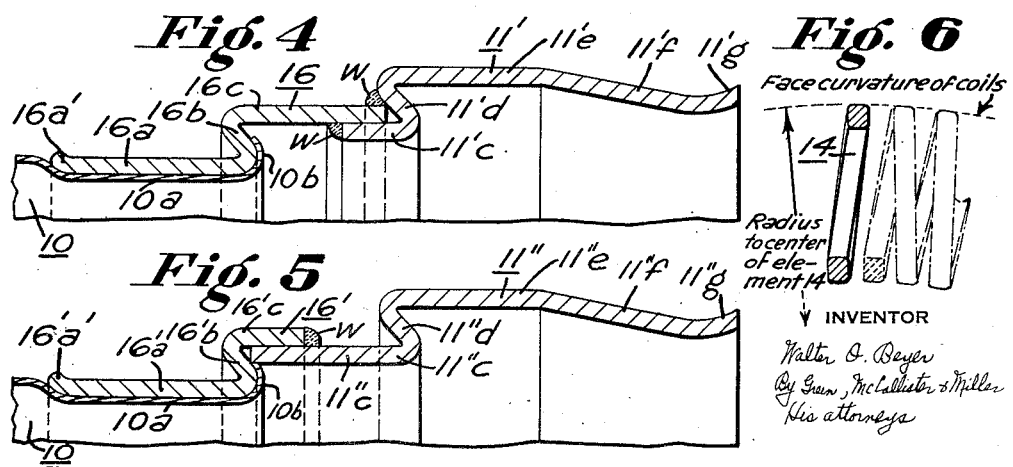

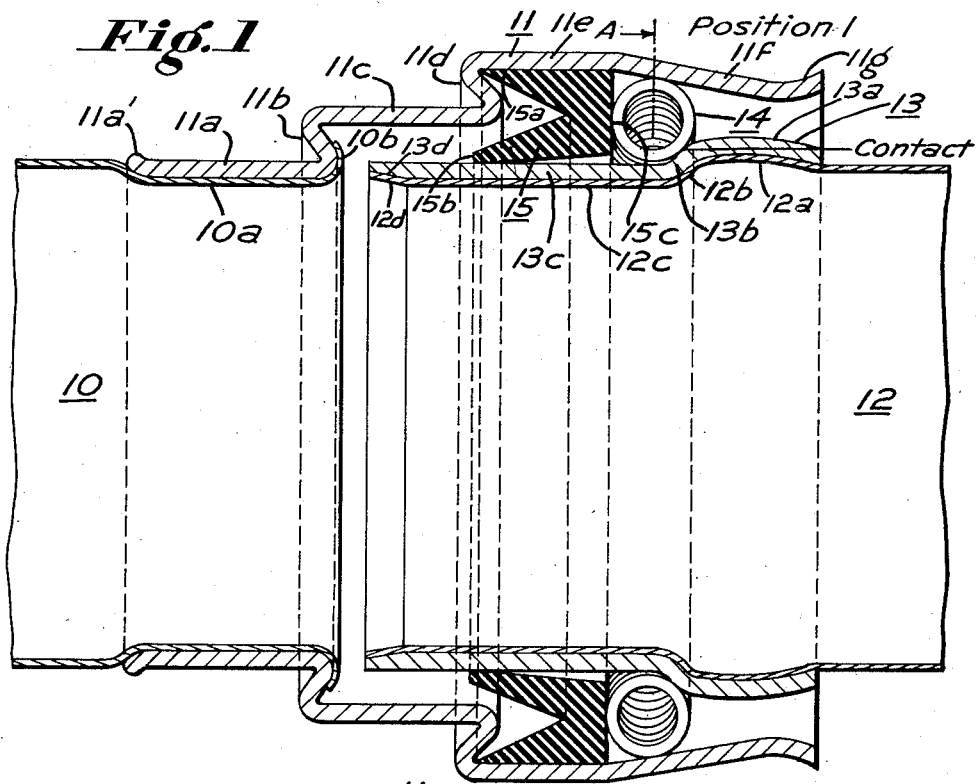
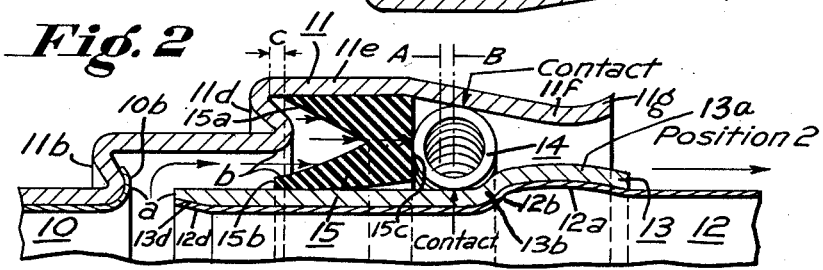
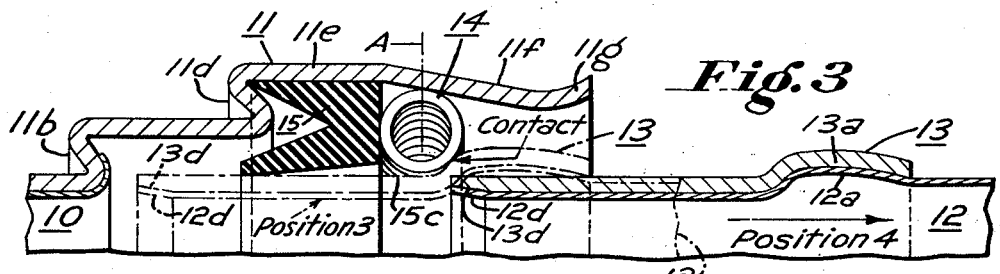
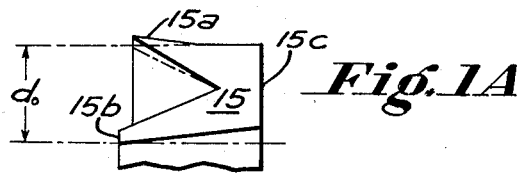

United States Patent Office 2,693,378
Patented Nov. 2, 1954

2,693,378

QUICK-RELEASE COUPLING

Walter O. Beyer, Pittsburgh, Pa.

Application December 11, 1950, Serial No. 200,191

6 Claims. (Cl. 285—163)

This invention relates to a fluid coupling of a self-sealing and self-latching or locking type and particularly, to a coupling having an improved release construction.

Previous to my present invention, difficulty has been encountered in removing or separating a pipe or conduit member from a coupling housing body member after the fluid pressure has been relieved. In installations where a pipe line system is to be moved from one location to another, it is highly desirable to have a coupling which will release its conduit or pipe member in a simple and easy manner after one portion of a farm has been irrigated, the fluid pressure has been turned off, and it is desired to move the pipe line system to another location.

The customary manner of releasing a conduit member from a housing body has been to turn one of them with respect to the other while withdrawing the conduit member. This entails considerable effort when a long pipe line system is employed and for this reason, I set out to develop an improved type of coupling, such that a turning movement or a movement in which the convolutions of a grip or locking coil are tilted will no longer be necessary.

Another difficulty is that when the quantity of fluid discharged by a booster pump exceeds the quantity discharged by the primary pump, suction will occur in the booster pump supply line which tends to suck out the sealing gaskets from the housing bodies of the couplings employed. The insertion of the pipe or conduit member also tends to move the gasket out of its proper working position within the housing body. Another factor is that silt and dirt tend to get into the coupling and build up at the seat between the gasket and the housing body. Heretofore, the housing body has had an offset for retaining the gasket which extends radially-inwardly, perpendicularly, or at right angles to the longitudinal axis of the housing body or to the axial withdrawing effort exerted by the fluid carried thereby.

In view of the above considerations, it has been an object of my invention to devise a coupling construction which will solve the above-mentioned problems;

Another object has been to devise a new and improved coupling arrangement which can be fabricated in a simplified and inexpensive manner;

A further object of my invention has been to provide what may be termed a push and pull type of coupling whose release action will be of a positive nature;

A further object has been to devise a coupling that will better control the operation and seating of the gasket;

These and many other objects of my invention will appear to those skilled in the art from the drawings, the specification and the claims of this disclosure.

In the drawings, Figure 1 is a longitudinal sectional view in elevation through a coupling construction of my present invention and is drawn to scale for a so-called four inch diameter pipe line system;

Figure 1A is a sectional detail view of the gasket shown in the construction of Figure 1, the full lines illustrate its normal pre-shaped form and the dot and dash lines illustrate its shape after it has been positioned in an operative relationship within the housing body;

Figure 2 is a fragmental view of an upper portion of the structure of Figure 1, showing the relationship of its operating parts when fluid pressure is being applied and the conduit member is being latched or held in position with respect to the housing body; as contrasted to this figure, Figure 1 shows the relationship of the parts when fluid pressure is released and after the conduit member has been manually pushed further into the housing body to effect a releasing action upon the grip or latching element;

Figure 3 is a view similar to Figure 2, but in the dot and dash line position 3 shows the conduit member in the relationship of Figure 1 and in full line position 4, shows the relationship of the conduit member after it has been withdrawn from the housing body;

Figures 4 and 5 are longitudinal sectional details through modified forms of coupling housing bodies that may be employed with the other coupling parts shown in Figure 1;

Figure 6 is an enlarged side detail in elevation and partial section illustrating the construction of a grip or locking element part employed in the coupling of Figure 1.

Referring particularly to Figure 1 of the drawings, I have shown a fluid conduit or pipe member 10 which is secured at its end to a housing body part or member 11 and a second pipe or conduit member 12 which is adapted to fit within the housing body, mount, or mounting body 11 in a spaced relationship with respect thereto and upon which is mechanically secured an operating surface wall or part 13. A coil-like flexible or spring-like grip or locking element or part 14 is operatively carried by the housing body part 11. A self-sealing fluid gasket 15 is positioned on the housing body member 11 in an operative relationship behind the latching element 14 to position it in a gripping or locking relationship when fluid pressure is applied and to seal off fluid flow between the housing body member 11 and the removable conduit member 12.

The operative positioning of the parts of the coupling is such that it will act with full effectiveness to hold the removable conduit member 12 in position when the parts are assembled and fluid pressure is applied, but will easily and quickly release the holding or gripping relationship of the locking element 14 when an abutment shoulder 13b carried by the removable conduit member 12 is given a longitudinal or axial, inward push against the locking element. This causes the locking element 14 to move within a cone-shaped or tapered throat 11f of the housing body 11 towards its diverging end from position B to position A, see Figures 1 and 2. At the same time, the gasket 15 moves axially-backwardly on a larger throat (cylindrical) diameter 11e. This movement releases compressive force on the outer diameter of the locking element 14 and permits it to expand to the enlarged diameter of the operating surface portion 11f and away from the cylindrical operating surface 13c of the part 13, see Figure 1. The diameter of the expansible and contractible latching element 14 is such that, at this time, it will be slightly less than the diameter of the operating spacing defined between the operating surface of the housing body member 11 at the point of contact or engagement of the element 14 and the operating surface wall part 13 of the conduit member 12. That is, the element or coil annulus 14 has a normal pre-shaped, flexible, internal diameter that is greater than the outer diameter of the operating surface of the part 13. As a result, the locking element 14 will move or spring away from a holding contacting or locking engagement with the part 13 to release such part and permit the removable fluid conduit member 12 to be pulled axially-outwardly from the housing body 11, without the necessity of tilting its convolutions during such withdrawing action.

In addition to the above, I have provided the housing body part 11 with a pair of longitudinally spaced-apart set-back or connecting shoulders 11b and 11d, the first of which serves to limit the maximum inward positioning of the removable conduit member 12, and the other of which serves to operatively position the sealing gasket 15. The angular relationship of the shoulders is preferably about 30° to 45° with respect to the horizontal (the axial plane of the coupling).

As illustrated in Figure 1, a coupling of my invention is particularly suited for the utilization of relatively thin or light-wall conduit members 10 and 12, such as of steel, aluminum or its alloys. The conduit member 10 has an inwardly-offset, cylindrical, securing end portion 10a which fits within a cylindrical, back end portion 11a of the housing body. The inner end 10b of the conduit member 10 is somewhat smoothly bent upwardly around the first re-entrant shoulder 11b and extends backwardly a short distance along its inner, sloped wall; this provides a rim lock for the conduit 10. A simple but highly strong and secure mechanical connection of a permanent type is thus provided between the conduit member 10 and the housing body part 11.

An intermediate, cylindrical portion 11c of the housing body is integral with and extends forwardly of the first shoulder 11b (shown as re-entrant) and has an internal diameter that is radially-outwardly offset with respect to (larger than the diameter of) the cylindrical end portion 11a. The front end of the second or intermediate portion 11c is integrally connected to the second shoulder 11d (also shown as re-entrant). A front, cylindrical portion 11e extends forwardly from the shoulder 11d and cylindrical portion 11c. It is thus seen that the cylindrical portions 11a, 11c and 11e have a stepped-up or outward relationship with respect to each other towards the front end of the housing body 11.

A tapered or cone-shaped throat portion 11f extends forwardly of the cylindrical portion 11e and terminates at its end in a bent-out or bell-shaped flange or mouth portion 11g. As far as the operation of the housing body 11 of the coupling is concerned, the cylindrical portion 11e and the cone-shaped converging portion 11f provide an operating surface wall which has two types of operating surfaces. The operating surface 11e carries the gasket 15 while the operating surface 11f carries the latching element 14 and is adapted to receive and force the latching element inwardly into engagement with the cylindrical portion 13c of the operating surface wall 13 when fluid pressure is applied.

The removable conduit member 12 is shown as having an outwardly offset or bulged, rounded, annular shoulder 12a at a spaced location with respect to its inner end 12d. The shoulder 12a is connected by a curved abutment 12b to an inwardly offset, cylindrical portion 12c. The cylindrical portion 12c as shown, has an internal, outwardly-flared, cone-shaped rim lip end 12d.

The operating surface wall part 13 which also serves to reinforce the connecting end portion of the removable conduit 12, has corresponding portions 13a, 13b, 13c and 13d which mechanically grip like portions of the conduit member 12. The rounded, outwardly offset, shoulder portion 13a and the abutment portion 13b securely grip the corresponding portions 12a and 12b of the conduit member and the inner, outwardly-diverging, cone-shaped rim lip 13d engages the outwardly-flared rim lip 12d of the conduit member, in such a manner that the wall part 13 provides a reinforcing sleeve for the connecting or operating end of the fluid conduit member 12.

As shown in Figure 1A, the gasket 15 has an outer side wall portion 15a extending forwardly from its relatively thin feather edge or outer sealing lip and backwardly from its pressure heel 15c. It also has a relatively blunt sealing lip on its opposed, inner side wall portion 15b that extends backwardly from the pressure heel 15c and slightly beyond the upper or outer feather lip edge. The opposite side wall portions 15a and 15b define a V-shaped fluid pressure chamber.

The normal pre-shaped diameter of the gasket 15 is such that its side wall portion 15a is compressed inwardly, as at $d_0$, see the dot and dash lines of Figure 1A, when it is carried in a mounted position within the housing body 11 and in an operative position with respect to the conduit member 12. As a result, the outer side wall portion 15a of the gasket is in compressive abutment with the cylindrical portion 11e of the housing body member when the gasket is positioned or carried in an operative relationship thereby. The inner side wall portion 15b of the gasket, on the other hand, has a somewhat loose, abutting contact with the operating wall part 13 of the conduit member 12. For best results, I have found that a gasket of somewhat medium hardness is the best, since a soft gasket does not have sufficient stiffness to provide a complete seal and a very hard gasket does not cling enough. Thus, a gasket having an index of about 60 to 65 is preferred.

Figure 1 illustrates the preliminary positioning of the parts of the coupling after they have been assembled and before fluid pressure has been applied. That is, the conduit member 12 can be pushed inwardly through the front throat or mouth end of the housing body member 11 until its abutment portion 13b strikes the locking or grip element 14. At this time, the pressure heel 15c of the gasket 15 is in abutment with the rear side of the locking element 14 and its outer feather edge almost reaches the full inner extent of the re-entrant recess provided by the housing shoulder 11d. Although the inner side wall portion 15b is in abutment with the wall part 13, it is a relatively loose abutment, as explained above, due to the fact that its side wall portion 15b has a diameter of increasing divergence (slopes outwardly) towards the heel portion 15c and with respect to the wall part 13.

It will be noted that the re-entrant shoulder portion 11b forms a positive, maximum, limit stop for the entrant end of the conduit member 12, even where the conduit member is pushed into position with a great deal of force and the locking element 14, by reason of its flexibility, permits the conduit member to go inwardly beyond the position of Figure 1. When such introducing force is released, however, the flexibility of the locking element 14 is sufficient to return the inner end of the conduit member 12 to the desired spaced relationship with respect to the shoulder 11b, as illustrated in Figure 1. At this time, the locking element 14 is being carried by the diverging end portion of the operating surface wall 11f of the housing body member, adjacent the cylindrical portion 11e and the inner diameter of the grip element 14 is out of engagement with the cylindrical operating surface portion 13c of the wall part 13. As a result, minimum friction is encountered in introducing the conduit member 12 into and removing it from the housing body member 11.

As shown in Figure 2, fluid passageways $a$ and $b$ are provided to the chamber of the gasket 15. When, as shown in Figure 2, positive fluid pressure is applied, the chamber of the gasket 15 tends to expand and force its inner and outer lips into tight sealing engagement with the two parts 11 and 13, to advance the gasket slightly forwardly (see space $c$ of Figure 2), so that its pressure heel 15c advances the locking element 14 along and towards the converging end of the cone-shaped or converging operating surface portion 11f of the housing body member or the diametrical center line of the element 14 moves from A to B. At the same time, such fluid pressure which is exerted in a longitudinal-axial direction, tends to cause the removable conduit member 12 and its part 13 to move slightly axially-outwardly, until the major vertical (radial) axis of the locking element 14 is in alignment with the cylindrical (operating surface) portion 13c and the element 14 is out of contact with the positioning abutment 13b. This combined movement causes the locking element 14 to slightly contract against its normal flexibility, so that it is in gripping engagement between the portions 11f and 13d. As the fluid pressure increases, these two movements tend to increase, so that the gripping action will increase correspondingly, thus providing a positive locking relationship between the housing member 11 and removable conduit member 12.

The spacing $a$ (see Figure 2) between the inner end of the conduit member 12 and the shoulder 11d provides a fluid passageway for fluid applied to the chamber defined by the gasket 15. The re-entrant or backwardly offset angles defined by the shoulder portions 11b and 11d causes a full swirling action of the pressure fluid which offsets any tendency for sludge, etc., to form at the base of such shoulder portions and particularly, between the wall portion 11e and the outer side wall portion 15a of the gasket. The gradual backward slope of the shoulder 11b, as contrasted to a normal, right angular slope of prior constructions prevents the deposition of sludge, sand and dirt particles and permits them to be washed out before they tend to adhere to the inner wall portion 11e of the housing body member 11. As shown in Figures 1 and 3, the shoulder 11d also serves to retain the gasket 15 within the housing body 11 when the conduit member 12 is being inserted and removed, and when suction or negative pressure force may be exerted.

When fluid is released and it is desired to remove the conduit 12 from the housing body 11, an inward, longitudinal-axial push is preliminarily imparted to the conduit member 12, so that its abutment portion 13b again engages the locking element 14 and pushes the element 14 back from the position of Figure 2 to the starting position of Figure 1. This starting position, as shown in Figure 1, provides a released relationship between the locking element 14 and the conduit member 12 or its part 13. As a result, as shown by the dot and dash and full line positions of Figure 3, after the released Position 3 has been effected, the conduit 12 may be easily withdrawn or pulled out to Position 4 by applying a longitudinal-axial withdrawing force thereto.

In Figure 6 I have shown a preferred form of construction of the locking or grip element 14. It will be noted that the outer contacting face portions of the flexible coil-like element 14 have a radius substantially corresponding to the radius of the element, itself. In other words, they are rounded off to provide a bearing-like action. This gives a lower coefficient of friction and avoids any abrasive or cutting action. In other words, it keeps the coefficient of friction below .4 and at an optimum of about .3. It also provides a maximum flexibility of the coil in its utilization.

The coupling construction as shown in Figure 1 provides a re-entrant shoulder 11d for retaining the gasket 14 which in effect, screens the outer lip edge of the gasket from direct impingement by sand and other particles and elements that would tend to back up and spoil its capillary seal. It also makes the gasket 14 secure during movement of the removable conduit 12.

It is possible to use relatively thin wall tubing of aluminum or steel and to provide a strong reinforcement of steel, brass, alloy steel or aluminum by the capstan type of holding action which secures the end of the conduit 12 to its reinforcing or protecting part 13 in tension and which secures the conduit 10 to the housing body 11. This type of fit gets tighter with usage of the coupling, as distinguished from a shear type of fit which may tend to work loose.

The protecting or reinforcing part 13 which also serves as an operating surface wall of the coupling, may be a short length, steel tube of four inches outer diameter and one eighth of an inch wall thickness mounted on a four inch outer diameter steel or aluminum tubing. An axial compressive force applied to slide the part 13 on the end of the conduit member 12 produces an extrusion-like flow of the metal of the light wall of the conduit 12, as it moves past the shoulder of the part 13. The unexpanded portion of the part 13 will have the same external diameter as the non-fitted or major wall portion of the conduit member 12. This is of great importance from the standpoint of interchangeability. I have determined that this can be accomplished employing any suitable material such as aluminum or steel for the conduit member 12 which will have an extrusion-like flow (corresponding to these metals) and will be compressible and will take a permanent set without crystallization.

It will appear from Figure 3 that the removable conduit or tubing member 12 can be easily released from the housing body 11 by a simple push and pull action with little or no turning effort on the conduit member, since the locking or grip element 14 is now in a released position (see the dot and dash lines of Figure 3 and the full lines of Figure 1) with respect thereto. The abutment 13b of the shoulder 13a serves as a limit stop for the grip element 14 when the parts are, for example, in the position of Figure 1; it with the grip element 14 provides a minimum clearance between the inserted end of the conduit or tube member 12 and the inside of the coupling body 11 which insures that hydraulic pressure will have free access in an operative manner to the pressure heel 15c to produce differential pressure and a consequent grip coil action.

Employing the principles of the Beyer et al. Patent No. 2,259,453 as to critical slope angle (1), the opposed operating or gripping surfaces 11f and 13c should have an effective convergence angle (1) of below about 17° as a maximum. If the O. D. (d) of the surface 13c is 4" and the I. D. (D) of 11e is 5⅛", the maximum convergence angle (1) is about 12° 45'. By way of example, if 11f has a converging angle of 10° and 13c is horizontal or has no angle, or if 11f has a converging angle of 20° and 13c has a diverging angle of 10° (the effective value of (1) thus being 20° less 10° or 10°), in each of these cases, the effective value of (1) will be well below the 12° 45' maximum.

In Figure 4, I have shown a modified form of housing body made up of two parts 11' and 16 that are separately formed and secured together by weld metal W to form a complete body that may be used in place of the body 11 of Figure 1. For the part 11', I have used the same numeral with the same alphabetic designators as in Figure 1, but with prime affixes to indicate similar portions; for the part 16, I have used the same alphabetic designators but a different numeral. It will be noted that the parts 11' and 16, each have outwardly-stepped annular wall portions and that the portion 11'c of least diameter of the part 11' is adapted to fit under or slide into the portion 16c of the other part 16.

In Figure 5, the body construction is somewhat similar to that of Figure 4, except that the portion 11''c is longer than the portion 16'c and is adapted to fit within the re-entrant shoulder 16'b, while in Figure 4, the portion 16c is longer than the portion 11'c and is adapted to fit within the shoulder 11'd and in Figure 4, two welds W are employed. As will be noted, prime affixes to the numeral 16 and double prime affixes to the numeral 11 are employed to indicate portions of the parts 11'' and 16' of the embodiment of this figure that correspond to portions of the embodiment of Figure 4.

What I claim is as follows:

1. In a quick release fluid coupling having a pair of fluid carrying members, wherein one of the members is a mounting body and the other of which is a conduit, wherein the mounting body receives an end portion of the conduit and each has an operating surface in an opposed operating space-defining relationship with the other; wherein the mounting body has an annular portion, a cone-shaped throat portion connected to one end of the annular portion and convering longitudinally forwardly at one end towards and diverging longitudinally backwardly at its opposite end away from the operating surface of the conduit, and a limit-stop portion adjacent the opposite end of the annular portion; wherein a flexible grip annulus is carried by the mounting body for operative movement longitudinally along the throat portion; wherein a fluid-pressure-sensitive annular gasket is operatively carried on the annular portion between the stop-limit portion and the grip annulus for longitudinal forward movement from and backward movement towards the stop-limit portion and is provided with a pressure heel that is movable in response to an application of fluid pressure to advance the grip annulus along the throat portion in the direction of its forwardly converging end, the combination of an annular grip portion on the operating surface of the conduit in an opposed relationship with the cone-shaped throat portion to be grip-engaged by the grip annulus to hold the members in position with respect to each other and to be engaged by the gasket to seal-off fluid flow between the opposed operating surfaces when the grip annulus is advanced forwardly along the cone-shaped throat portion towards its converging end by the application of fluid pressure to the gasket, the grip annulus having a gripping surface along its outer diameter and another gripping surface along its inner diameter, one of said gripping surfaces being positioned to grip-engage the throat portion and the other of said gripping surfaces being positioned to grip-engage said annular grip portion when the grip annulus is advanced forwardly along the throat portion, said other gripping surface having a spaced-apart relationship with and about said annular grip portion when the grip annulus is in an initial operating position, a radially-projecting peripheral release shoulder positioned longitudinally-forwardly of said annular grip portion in an opposed relationship with the cone-shaped throat portion for longitudinal operative movement relative thereto into engagement with a forward face portion of the grip annulus to push the grip annulus backwardly along the cone-shaped throat portion in the direction of its diverging end and effectively release its grip engagement with said annular grip portion when the conduit is moved longitudinally-inwardly relative to the mounting body, the gasket being positioned to be moved backwardly by the grip annulus with respect to the annular portion towards the stop-limit portion, and one member being then removable from the other member by a longitudinal pull thereon without a relative turning movement being exerted between the members.

2. In a push-pull quick release fluid coupling of the character described for removably receiving an end portion of a conduit member therein, wherein the coupling has a housing; the housing has an internal operating surface defined by an annular portion, a cone-shaped throat portion, and a radially-inwardly-offset abutment portion, the throat portion is connected to one end of and converges outwardly-forwardly from the annular portion, and the abutment portion is connected to the opposite end of the annular portion; wherein a flexible grip annulus is carried by the housing for operative movement along the throat portion; and wherein a fluid-pressure-sensitive annular gasket is operably carried on the annular portion between the abutment portion and the grip annulus for forward movement from and backward movement against the abutment portion and is provided with a pressure heel that is movable in response to an application of fluid pressure to advance the grip annulus forwardly along the thorat portion in the direction of its convergence, the combination of an external operating surface on the end portion of the conduit member in an opposed-annular operating-space defining relationship with the internal operating surface of the housing, said external operating surface being defined by a cylindrical portion extending from an inner end portion of the conduit member, said cylindrical portion being grip-engaged by the grip annulus to hold the conduit member in position within the housing when the grip annulus is advanced forwardly along the throat portion in the direction of its convergence by the application of fluid pressure to the gasket, said cylindrical portion also being engaged by the gasket to seal-off fluid flow between the opposed operating surfaces when fluid pressure is being applied, said external operating surface also being defined by a radially-outwardly-projecting peripheral release shoulder portion connected to said cylindrical portion outwardly-forwardly thereof, said shoulder portion being positioned in an adjacent relationship with the cone-shaped throat portion of the internal operating surface for an opposed operative movement therewithin into engagement with a forward face portion of the grip annulus to push it backwardly along the throat portion in the direction of its divergence and effectively release its gripping engagement with said cylindrical portion when the end portion of the conduit member is pushed inwardly with respect to the housing, the gasket being positioned to be moved backwardly along the annular portion by the grip annulus, the end portion of the conduit member being then removable from the housing by an outward pull thereon without the necessity of maintaining a turning movement of the conduit member with respect to the housing, the flexible grip annulus in its initial relationship within the housing portion, before the application of fluid pressure, having an internal diameter that is slightly greater than the external diameter of said cylindrical portion and being substantially smaller than the external diameter of said shoulder portion, and said shoulder portion having a relatively smoothly curved annular shape.

3. In a push-pull quick release fluid coupling of the character described for removably receiving an end portion of a conduit member therein, wherein the coupling has a housing, the housing has an internal operating surface defined by an annular portion, a cone-shaped throat portion, and a radially-inwardly-offset abutment portion, the throat portion is connected to one end of and converges outwardly-forwardly from the annular portion, and the abutment portion is connected to the opposite end of the annular portion; wherein a flexible grip annulus is carried by the housing for operative movement along the throat portion; and wherein a fluid-pressure-sensitive annular gasket is operably carried on the annular portion between the abutment portion and the grip annulus for forward movement from and backward movement against the abutment portion and is provided with a pressure heel that is movable in response to an application of fluid pressure to advance the grip annulus forwardly along the throat portion in the direction of its convergence, the combination of an external operating surface on the end portion of the conduit member in an opposed-annular operating-space defining relationship with the internal operating surface of the housing, said external operating surface having a cylindrical portion extending from an inner end portion of the conduit member, the grip annulus in its initial positioning having a slightly greater internal diameter than the external diameter of said cylindrical portion, said cylindrical portion being grip-engaged by the grip annulus to hold the conduit member in position within the housing when the grip annulus is advanced forwardly along the throat portion in the direction of its convergence by the application of fluid pressure to the gasket, said cylindrical portion also being engaged by the gasket to seal-off fluid flow between the opposed operating surfaces when fluid pressure is being applied, said external operating surface also being defined by a radially-outwardly-projecting peripheral release shoulder portion connected to said cylindrical portion outwardly-forwardly thereof, said shoulder portion being positioned in an adjacent relationship with the cone-shaped throat portion of the internal operating surface for an opposed operative movement therewithin into engagement with a forward face portion of the grip annulus to push it backwardly along the throat portion in the direction of its divergence and effectively release its gripping engagement with said cylindrical portion when the end portion of the conduit member is pushed inwardly with respect to the housing, the gasket being positioned to be moved backwardly along the annular portion by the grip annulus, and the end portion of the conduit member being then removable from the housing by an outward pull thereon without the necessity of maintaining a turning movement of the conduit member with respect to the housing.

4. In a coupling as defined in claim 1 wherein, said external operating surface is a reinforcing sleeve mounted over the end portion of the conduit member, said sleeve terminates at its outer end in said shoulder portion, and the end portion of the conduit member has a corresponding shoulder portion interfitting within said first-mentioned shoulder portion to secure said sleeve in position thereon.

5. In a coupling as defined in claim 1 wherein, the abutment portion of the housing defines an annular groove with the annular portion of the housing and also defines an annular re-entrant portion spaced radially-inwardly from the annular groove that has an internal diameter substantially greater than the internal diameter of the gasket, the annular gasket has a pair of inner and outer side wall portions defining a backwardly-open fluid pressure chamber within the gasket, said outer side wall portion of the gasket is positioned in alignment with and within said annular groove and in a spaced relationship with said re-entrant portion, said re-entrant portion projects in a spaced relationship within the fluid pressure chamber of the gasket, and said inner side wall portion of the gasket defines an open fluid passageway into the fluid pressure chamber to provide a full swirling action of pressure fluid between the abutment portion and the fluid pressure chamber of the gasket.

6. In a push-release fluid coupling for removably receiving an end portion of a conduit, wherein the coupling has a mount, the mount has an operating surface defined by an annular portion, a cone-shaped throat portion and a radially offset abutment portion, the throat portion is connected to one end of and converges outwardly-forwardly from the annular portion towards the end portion of the conduit, and the abutment portion is positioned adjacent the opposite end of the annular portion; wherein a flexible grip annulus is carried by the mount for operative-engaging movement along the throat portion thereof; and wherein a fluid-pressure-sensitive annular gasket is operatively carried on the annular portion between the abutment portion and the grip annulus for forward movement from and backward movement towards the abutment portion and is provided with a pressure heel that is movable in response to an application of fluid pressure to advance the grip annulus forwardly along the throat portion in the direction of its above-mentioned convergence, the combination of an operating surface on the end portion of the conduit in an opposed-annular operating space-defining relationship with the operating surface of the mount, said operating surface of the conduit having an annular grip portion extending from the end of the conduit member, the grip annulus having an outer gripping surface along its outer diameter to grip-engage the throat portion and having an inner gripping surface along its inner diameter to grip-engage said annular grip portion when the grip annulus is advanced forwardly along the throat portion in the direction of its convergence by the application of fluid pressure to the gasket, the grip annulus in its initial positioning having a greater inner diameter along its inner gripping surface than the outer diameter of said annular grip portion, said annular grip portion being engaged by the gasket to seal-off fluid flow between the opposed operating surfaces when the fluid pressure is being applied, said operating surface of the conduit having a radially-projecting peripheral release shoulder connected to said annular grip portion outwardly-forwardly thereof, said shoulder portion being positioned in an opposed relationship with the cone-shaped throat portion for opposed operative movement with respect thereto into engagement with a forward face portion of the grip annulus to push it backwardly along the throat portion in the direction of its divergence with respect to the end portion of the conduit and return the grip element to a clearance-space-defining relationship with respect to said annular grip portion when the conduit is moved inwardly relative to the mount, the gasket being operatively positioned for backward movement with respect to the annular portion of the mount by the grip annulus, and the end portion of the conduit being then removable from the mount without the necessity of a relative turning movement between the conduit and the mount.

References Cited in the file of this patent

UNITED STATES PATENTS

| Number | Name | Date |
| --- | --- | --- |
| 1,928,836 | Loughead | Oct. 3, 1933 |
| 2,073,909 | Stetcher | Mar. 16, 1937 |
| 2,165,052 | Hering | July 4, 1939 |
| 2,184,376 | Beyer | Dec. 26, 1939 |
| 2,259,453 | Beyer | Oct. 21, 1941 |
| 2,387,182 | Procter | Oct. 16, 1945 |
| 2,529,098 | Noll | Nov. 7, 1950 |
| 2,587,810 | Beyer | Mar. 4, 1952 |
| 2,638,362 | Sherman | May 12, 1953 |

FOREIGN PATENTS

| Number | Country | Date |
| --- | --- | --- |
| 458,958 | Great Britain | Dec. 30, 1936 |